No. 683,647. Patented Oct. 1, 1901.
G. C. HINKLEY & H. P. CLAUSSEN.
FRICTION CLUTCH.
(Application filed Nov. 25, 1895.)
(No Model.)
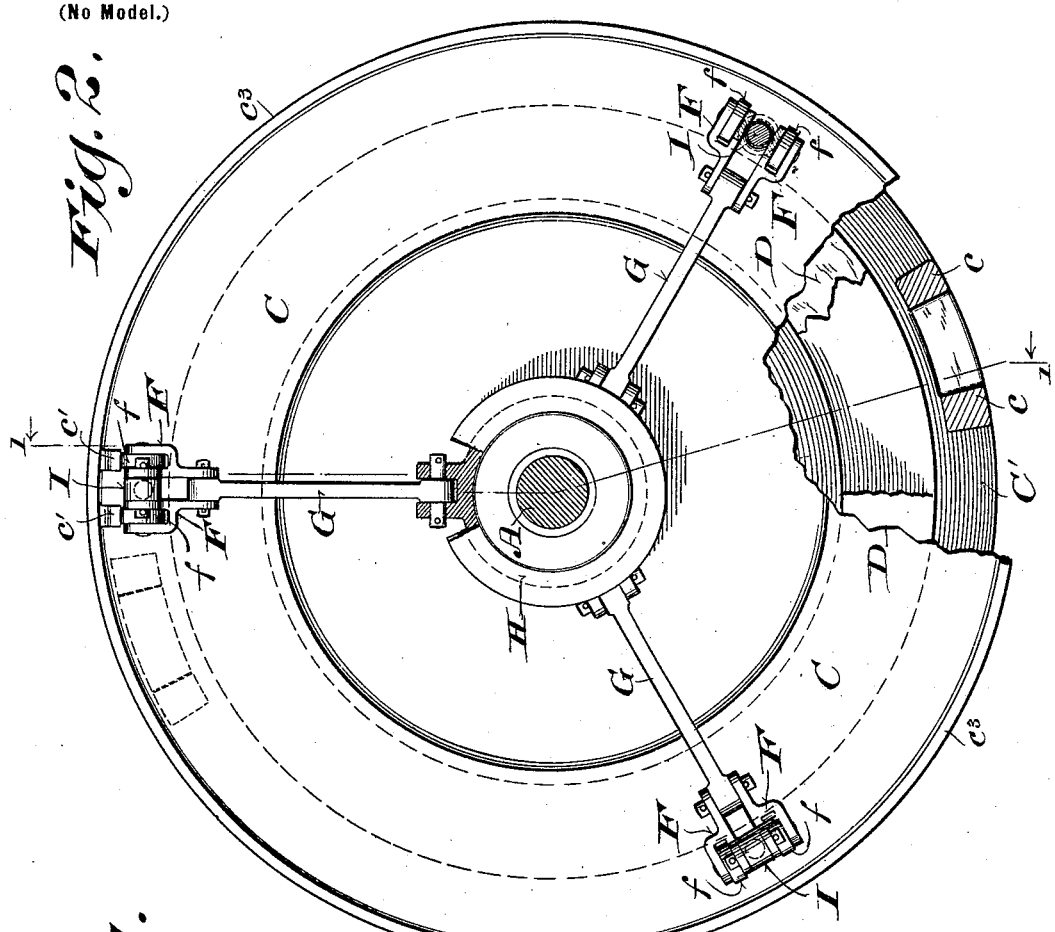
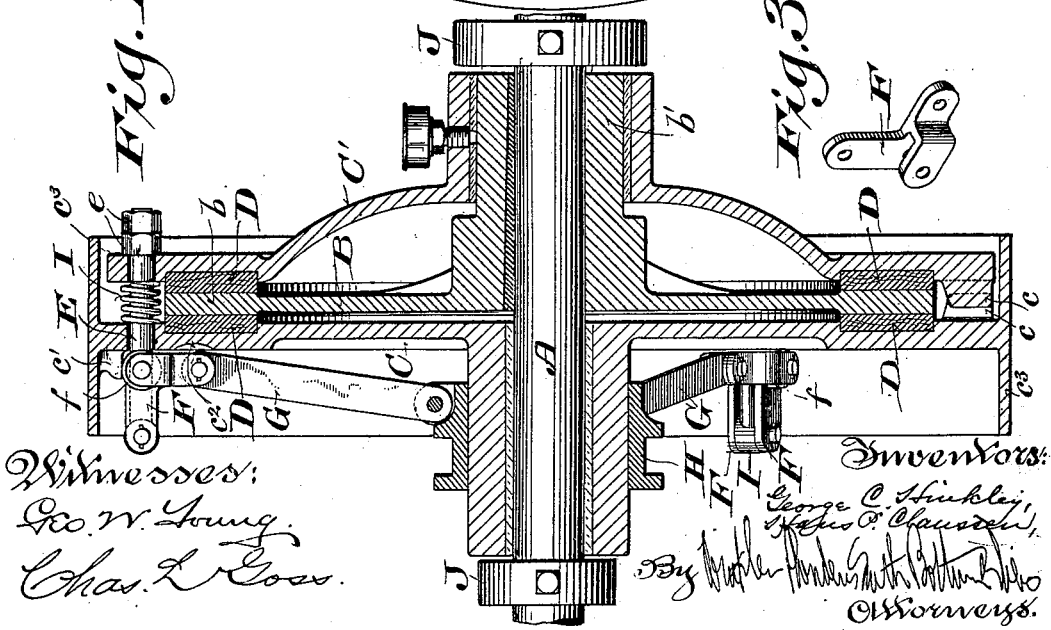

UNITED STATES PATENT OFFICE.

GEORGE C. HINKLEY AND HANS P. CLAUSSEN, OF MILWAUKEE, WISCONSIN; SAID CLAUSSEN ASSIGNOR, BY MESNE ASSIGNMENTS, TO ALLIS-CHALMERS COMPANY, OF NEW JERSEY.

FRICTION-CLUTCH.

SPECIFICATION forming part of Letters Patent No. 683,647, dated October 1, 1901.

Application filed November 25, 1895. Serial No. 570,047. (No model.)

*To all whom it may concern:*

Be it known that we, GEORGE C. HINKLEY and HANS P. CLAUSSEN, of Milwaukee, in the county of Milwaukee and State of Wisconsin, have invented certain new and useful Improvements in Friction-Clutches; and we do hereby declare that the following is a full, clear, and exact description of the invention, which will enable others skilled in the art to which it pertains to make and use the same, reference being had to the accompanying drawings, and to the letters of reference marked thereon, which form a part of this specification.

The main objects of our invention are to produce a powerful grip or engagement between the friction-surfaces of the clutch, to provide adjustments for taking up wear and play and for producing an equal or uniform engagement of the friction-surfaces, and generally to simplify and improve the construction and operation of clutches of this class.

It consists in certain novel features in the construction and arrangement of component parts of the clutch, as hereinafter particularly described, and pointed out in the claims.

In the accompanying drawings like letters designate the same parts in the several figures.

Figure 1 is a section of our improved clutch, cutting it axially on the line 1 1, Fig. 2. Fig. 2 is a side elevation viewed from the left with reference to Fig. 1, certain parts being broken away and shown in section; and Fig. 3 is a perspective view of a jaw operating and locking lever.

A designates the shaft on which the clutch is mounted. B is a friction-disk fixed upon said shaft and formed or provided with a radially-projecting circular rim $b$.

C and C' are jaw-carriers loosely mounted on opposite sides of the disk B, one upon shaft A and the other upon the hub $b'$ of said disk. To the inner faces of these jaw-carriers, which are preferably recessed to receive them, are attached opposite the rim $b$ annular or segmental friction blocks or jaws D D, of wood, paper, or other suitable wearing material. The jaw-carriers are loosely connected by eyebolts E E, passing through holes therein parallel with the axis of the clutch, and are formed on their inner faces with interlocking projections $c\ c$, which compel them to turn together and prevent the eyebolts E E from binding therein. The eyebolts are threaded at one end and provided outside of the jaw-carrier C' with nuts $e\ e$, and to their opposite ends, which project beyond the outer face of the other jaw-carrier C, are pivoted at one end elbow-shaped levers F, one on each side of each bolt. To the opposite ends of these levers, which project toward the axis of the clutch, are pivoted links G G, which are in turn pivoted to a grooved fork-collar H, loosely mounted and movable endwise upon the hub of the jaw-carrier C. One arm of each lever F is forked, as shown in Fig. 3, to receive a friction-roller $f$, which projects at its periphery slightly beyond the elbow or angle of said lever, as shown in Fig. 1. Upon the eyebolts E E are mounted spiral springs I, which bear at their ends against the jaw-carriers and tend to move the jaws D D out of contact with the rim $b$ of the friction-disk. The jaw-carriers are limited in their outward movement and retained in their proper relative positions with respect to the friction-disk by collars J J, fixed upon the shaft A. The jaw-carrier C is formed or provided with lugs or stops $c'\ c'$, by which the levers F are limited in their outward movement, with their outer arms, that are pivoted to the eyebolts E, approximately in line therewith or with the centers of the friction-rollers $f$ a little outside of the axes of said bolts. On the opposite sides of the eyebolts E from said stops $c'$ the jaw-carrier C is formed in its outer face with shallow seats or depressions $c^2$ for the friction-rollers $f$ when the levers F are drawn toward the clutch-shaft for disengaging the jaws from the intermediate driving-disk.

Our improved clutch operates as follows: By moving the fork-collar H toward the carrier C the links G approach a perpendicular position and force the levers F outward into the position in which they are shown in Fig. 1, the friction-rollers $f$ bearing against the outer face of said carrier and engaging with the stops $c'$ when the outer arms of said levers are brought into line with or a little past the centers of the eyebolts E. The jaw-carriers are thus drawn together against the tension of springs I and the jaws D D are forced into engagement with opposite faces of the rim $b$ of the driving-disk B. In this position the parts of the clutch are locked and held by the elbow-levers F, the centers of the friction-rollers $f$ being in line with or a little outside of the axes of the eyebolts and the pivot connections between them and the outer arms of said levers. By moving the fork-collar H away from the jaw-carrier C the levers F are swung inwardly toward the clutch-shaft, permitting the jaw-carriers to be forced apart and the jaws out of engagement with the driving-disk by the springs I. The jaw-carriers and jaws are adjusted to take up play or wear by turning up the nuts $e\ e$ on the threaded ends of the eyebolts E. By the same means the faces of the jaws may be set exactly parallel with the opposing faces of the rim $b$, so as to produce even uniform engagement between them throughout their length.

The collars J prevent contact of either jaw D with the rim $b$ of the friction-driver and consequent wear of the engaging surfaces and burning of the wood or other material of which the jaw is made when the jaw-carriers are moved apart.

For a friction-grip pulley the jaw-carrier C is formed or provided with a rim $c^3$, as shown. For coupling two shaft-sections arranged end to end in line with each other the friction-disk B is fixed on the end of one section and the jaw-carrier C is fixed on the adjacent end of the other section, while the jaw-carrier C' is loosely mounted on the hub of said disk. In the latter case the pulley-rim $c^3$ may be omitted.

We claim—

1. In a friction-clutch the combination with a driving disk or wheel of jaw-carriers arranged concentrically on opposite sides thereof and movable axially toward and from it, bolts or rods loosely connecting said jaw-carriers, elbow-shaped levers pivoted at their outer ends directly to said bolts or rods, and adapted to bear at their elbows loosely against the adjacent jaw-carrier and to be moved radially thereon, and an axially-movable collar connected by links with the other ends of said levers, substantially as and for the purposes set forth.

2. In a friction-clutch the combination with a driving disk or wheel, of jaw-carriers arranged concentrically on opposite sides thereof, and both movable axially toward and from it, collars adapted to limit the outward movement of said jaw-carriers, bolts or rods loosely connecting them parallel with the axis of the clutch, elbow-levers pivoted at their outer ends to said bolts or rods, and arranged to bear at their elbows loosely against the adjacent jaw-carrier and to be moved radially thereon, springs mounted upon said bolts or rods between said jaw-carriers and tending to force the latter apart, and an axially-movable collar connected by links with the inner ends of said levers, substantially as and for the purposes set forth.

3. In a friction-clutch the combination with a driving disk or wheel, of jaw-carriers arranged concentrically on opposite sides thereof and both movable axially toward and from it, bolts or rods passing loosely through said carriers and provided at one end with adjusting-nuts, elbow-levers pivoted at their outer ends to said bolts or rods on the opposite side of the clutch, with their elbows presented toward and adapted to bear against the adjacent jaw-carrier and to be moved radially thereon, and an axially-movable fork-collar connected with the inner ends of said levers by links, substantially as and for the purposes set forth.

4. In a friction-clutch the combination with a driving disk or wheel, of jaw-carriers arranged on opposite sides thereof and movable axially toward and from it, bolts or rods loosely connecting said jaw-carriers parallel with the axis of the clutch, elbow-levers pivoted at their outer ends to said bolts or rods and provided at their elbows, which are presented toward the adjacent jaw-carrier, with friction-rollers, and an axially-movable fork-collar connected by links with the inner ends of said levers, substantially as and for the purposes set forth.

5. In a friction-clutch the combination with a driving disk or wheel of jaw-carriers arranged on opposite sides thereof and movable axially toward and from it, bolts or rods loosely connecting said jaw-carriers parallel with the axis of the clutch, elbow-levers pivoted at their outer ends to said bolts or rods with their elbows presented toward the adjacent jaw-carrier, which is provided with stops to limit said levers in their outward movement in locking position, and an axially-movable fork-collar connected by links with the inner ends of said levers, substantially as and for the purposes set forth.

6. In a friction-clutch the combination with a friction driving disk or wheel, of jaw-carriers arranged concentrically therewith on opposite sides thereof and movable axially toward and from it, bolts or rods loosely connecting said jaw-carriers parallel with the axis of the clutch, elbow-shaped levers pivoted to said bolts or rods, one on each side of each bolt, and provided at their elbows, which are presented toward the adjacent jaw-carrier with friction-rollers, and an axially-movable fork-collar connected by links with the inner ends of said levers, substantially as and for the purposes set forth.

7. In a friction-clutch the combination with a driving disk or wheel of jaw-carriers arranged concentrically therewith on opposite sides thereof and both movable axially toward and from the same, bolts or rods loosely connecting said jaw-carriers parallel with the axis of the clutch, elbow-levers pivoted at their outer ends to said bolts or rods with their elbows presented toward and adapted to loosely engage the adjacent jaw-carrier and to be moved radially thereon, an axially-movable fork-collar connected by links with the inner ends of said levers, and springs interposed between and tending to separate said jaw-carriers, substantially as and for the purposes set forth.

8. In a friction-clutch the combination of a friction-disk fixed on the clutch-shaft, jaw-carriers provided with jaws on opposite sides of said disk and movable endwise of the clutch-shaft, means for forcing said jaw-carriers toward each other and for holding the jaws in engagement with said disk, means for moving said jaw-carriers apart when they are released, and stops arranged in such positions as to limit the outward movement of each jaw-carrier to an extent less than the total range of movement of both jaw-carriers, whereby the opposing jaws when separated will both be carried out of contact with said disk, substantially as and for the purposes set forth.

In testimony that we claim the foregoing as our own we affix our signatures in presence of two witnesses.

GEORGE C. HINKLEY.
HANS P. CLAUSSEN.

Witnesses:
CHAS. L. GOSS,
M. L. EMERY.